(12) United States Patent
Kulkarni et al.

(10) Patent No.: US 11,176,121 B2
(45) Date of Patent: Nov. 16, 2021

(54) GLOBAL TRANSACTION SERIALIZATION

(71) Applicant: International Business Machines Corporation, Armonk, NY (US)

(72) Inventors: Kishor Kulkarni, Dist-Gadag (IN); Sreejith Nalamvathukkal, Bangalore (IN); Madhu B. Ananthapadmanabh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 16/423,634

(22) Filed: May 28, 2019

(65) Prior Publication Data

US 2020/0379975 A1    Dec. 3, 2020

(51) Int. Cl.
*G06F 16/23* (2019.01)

(52) U.S. Cl.
CPC ...... *G06F 16/2379* (2019.01); *G06F 16/2343* (2019.01)

(58) Field of Classification Search
CPC ............. G06F 16/2379; G06F 16/2343; G06F 16/2336; G06F 16/2358; G06F 16/235; G06F 16/2308; G06F 16/2315; G06F 16/2322; G06F 16/2329; G06F 9/465; G06F 9/466; G06F 16/1865; G06F 16/176; G06F 16/1774; G06F 2221/214; G06F 2221/2147; G06F 9/50; G06F 9/5005; G06F 9/5011; G06F 9/5022; G06F 9/5027; G06F 9/5072; G06F 9/542; G06F 9/546
See application file for complete search history.

(56) References Cited

U.S. PATENT DOCUMENTS

| | | | |
|---|---|---|---|
| 9,104,471 B2 | 8/2015 | Burghard et al. | |
| 9,171,019 B1* | 10/2015 | Donlan | G06F 16/2343 |
| 2007/0050377 A1* | 3/2007 | Srivastava | G06F 16/1774 |
| 2008/0082761 A1* | 4/2008 | Herness | G06F 9/526 |
| | | | 711/152 |
| 2009/0282043 A1* | 11/2009 | Dharmavaram | G06F 16/2343 |
| 2009/0327292 A1* | 12/2009 | Janssen | G06F 16/2365 |

(Continued)

OTHER PUBLICATIONS

Mell et al., "The NIST Definition of Cloud Computing", National Institute of Standards and Technology, U.S. Dept. of Commerce, NIST Special Publ. 800-145, Sep. 2011, 7 pages.

*Primary Examiner* — David T. Brooks
(74) *Attorney, Agent, or Firm* — Heslin Rothenberg Farley & Mesiti P.C.; Edward Wixted, Esq.

(57) ABSTRACT

A method, computer program product, and a system to globally serialize transactions where a processor(s) establishes a communications connection a (serialization) resource and a resource manager for a distributed computing system. The processor(s) obtains a first request from an application executing on the resource for access to a global resource managed by the resource manager, for executing a transaction. The processor(s) implements a lock for the global resource in an object store of the resource manager over the communications connection. The processor(s) communicates the lock to the application, which executes the transaction and the processor(s) updates a memory with a record comprising attributes of the lock. The processor(s) obtains a second request from the application to terminate the lock, obtains, identifies the lock for the transaction, in the object store, and updates the object store to delete the lock.

17 Claims, 8 Drawing Sheets

(56) References Cited

U.S. PATENT DOCUMENTS

| | | | |
|---|---|---|---|
| 2010/0023803 A1* | 1/2010 | Lehr | G06F 11/2028 |
| | | | 714/5.11 |
| 2010/0106697 A1* | 4/2010 | Enoki | G06F 9/52 |
| | | | 707/704 |
| 2013/0036136 A1* | 2/2013 | Horii | G06F 16/2343 |
| | | | 707/770 |
| 2013/0073513 A1 | 3/2013 | Kemper et al. | |
| 2013/0086018 A1* | 4/2013 | Horii | G06F 16/2343 |
| | | | 707/703 |
| 2014/0172775 A1 | 6/2014 | Niehoff et al. | |
| 2014/0365549 A1* | 12/2014 | Jenkins | G06F 9/5077 |
| | | | 709/201 |
| 2015/0006466 A1 | 1/2015 | Tonder et al. | |
| 2016/0092488 A1* | 3/2016 | Sun | G06F 16/2365 |
| | | | 707/690 |
| 2018/0011744 A1* | 1/2018 | Liguori | G06F 9/526 |

* cited by examiner

GLOBAL TRANSACTION SERIALIZATION

BACKGROUND

Online transaction processing or an online transaction processor (OLTP), also referred to as online transmission processing, is a class of software programs capable of supporting transaction-oriented applications on the Internet. OLTP can also be used to refer to an online transaction processor. Some examples of OLTP systems are data entry systems for order entry, financial transactions, customer relationship management (CRM), and/or retail sales. Thus, OLTP platforms provide a rich set of resources such as networking, memory, serialization, files, queues, etc. The platform guarantees data integrity across these resources along with other resource managers to enable a business application developer to focus on business problems, rather than managing low-level resources.

In existing OLTP platforms, global transaction serialization is maintained by software in a resource-specific manner and therefore, these solutions are not scalable across shared computing environments. The scope of the resources is limited to an instance of the OLTP (e.g., in a Customer Information Control System (CICS), resources are local to a CICS regions). This limitation proves problematic when OLTP platforms are distributed utilizing a distributed and/or shared computing environment, including but not limited to, a cloud computing system. Deploying an OLTP platform to a distributed environment and thus, scaling the OLTP platform horizontally (i.e., adding more machines to a pool of resources), creates consistency issues between resource. For example, horizontally scaling a region of a resource creates multiple copies of the same region running on different nodes, and the workload will be balanced across these regions. Using a traditional serialization facility does not adequately address this issue because if two instances of an application are running in a different instance of the same region of a resource, the serialization will break as the scope of the commands utilized to serialize access to the shared resource as local to a region.

Based on the software-related described, hardware solutions (e.g., a coupling facility) can be implemented in certain environments, but these solutions are specific to the environment and are not platform-neutral. Given that distributed computing environments are comprised of a variety of different hardware and software elements, which are generally beyond the control of an entity deploying an OLTP platform, a specialized hardware approach is not practical.

SUMMARY

Shortcomings of the prior art are overcome and additional advantages are provided through the provision of a method for globally serializing transaction. The method includes, for instance: establishing, by one or more processors of a serialization resource, a communications connection between the serialization resource and a resource manager for a distributed computing system; obtaining, by the one or more processors, a first request from an application executing on the serialization resource for access to a global resource managed by the resource manager, for executing a transaction; implementing, by the one or more processors, a lock for the requested global resource in an object store of the resource manager, for the transaction, wherein the implementing is over the communications connection; communicating, by the one or more processors, the implementing of the lock to the application, wherein based on obtaining the communication, the application executes the transaction utilizing the requested global resource; based on implementing the lock, updating, by the one or more processors, a memory accessible to the serialization resource with a record comprising attributes of the lock; obtaining, by the one or more processors, a second request from the application to terminate the lock; based on the second request, obtaining, by the one or more processors, from the memory, the attributes of the lock; identifying, by the one or more processors, via the communications connection, based on the attributes, the lock for the transaction, in the object store of the resource manager; and updating, by the one or more processors, via the communications connection, the object store of the resource manager, to delete the lock on the requested global resource.

Shortcomings of the prior art are overcome and additional advantages are provided through the provision of a computer program product for globally serializing transactions. The computer program product comprises a storage medium readable by a processing circuit and storing instructions for execution by the processing circuit for performing a method. The method includes, for instance: establishing, by the one or more processors of a serialization resource, a communications connection between the serialization resource and a resource manager for a distributed computing system; obtaining, by the one or more processors, a first request from an application executing on the serialization resource for access to a global resource managed by the resource manager, for executing a transaction; implementing, by the one or more processors, a lock for the requested global resource in an object store of the resource manager, for the transaction, wherein the implementing is over the communications connection; communicating, by the one or more processors, the implementing of the lock to the application, wherein based on obtaining the communication, the application executes the transaction utilizing the requested global resource; based on implementing the lock, updating, by the one or more processors, a memory accessible to the serialization resource with a record comprising attributes of the lock; obtaining, by the one or more processors, a second request from the application to terminate the lock; based on the second request, obtaining, by the one or more processors, from the memory, the attributes of the lock; identifying, by the one or more processors, via the communications connection, based on the attributes, the lock for the transaction, in the object store of the resource manager; and updating, by the one or more processors, via the communications connection, the object store of the resource manager, to delete the lock on the requested global resource.

Shortcomings of the prior art are overcome and additional advantages are provided through the provision of a system for globally serializing transactions. The system comprises a memory, one or more processors in communication with the memory, and program instructions executable by the one or more processors via the memory to perform a method. The method includes, for instance: establishing, by the one or more processors of a serialization resource, a communications connection between the serialization resource and a resource manager for a distributed computing system; obtaining, by the one or more processors, a first request from an application executing on the serialization resource for access to a global resource managed by the resource manager, for executing a transaction; implementing, by the one or more processors, a lock for the requested global resource in an object store of the resource manager, for the transaction, wherein the implementing is over the communications connection; communicating, by the one or more processors, the implementing of the lock to the application, wherein based on obtaining the communication, the application executes the transaction utilizing the requested global resource; based on implementing the lock, updating, by the one or more processors, a memory accessible to the serialization resource with a record comprising attributes of the lock; obtaining, by the one or more processors, a second request from the application to terminate the lock; based on the second request, obtaining, by the one or more processors, from the memory, the attributes of the lock; identifying, by the one or more processors, via the communications connection, based on the attributes, the lock for the transaction, in the object store of the resource manager; and updating, by the one or more processors, via the communications connection, the object store of the resource manager, to delete the lock on the requested global resource.

Methods and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
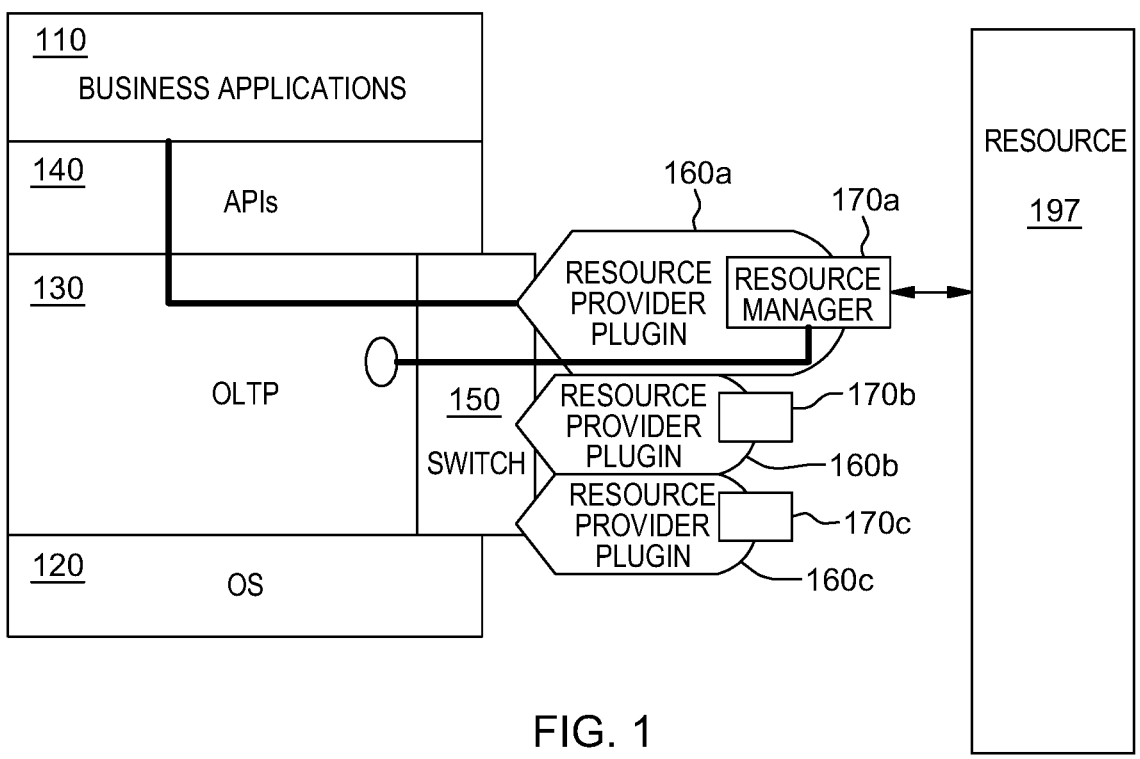
FIG. 1 is depicts a technical environment into which various aspects of some embodiments of the present invention can be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 6:
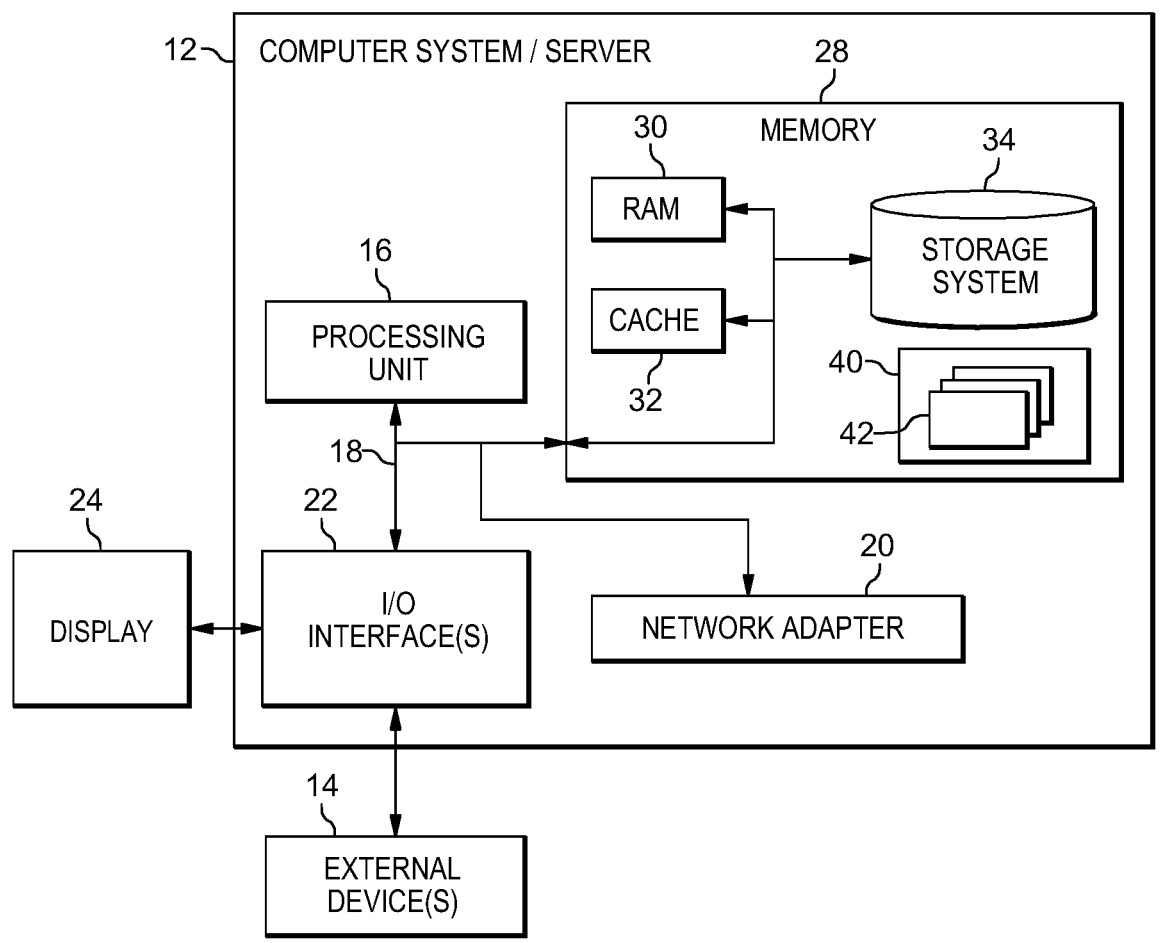
FIG. 6 depicts one embodiment of a computing node that can be utilized in a cloud computing environment.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program/utility 40, having a set (at least one) of program modules 42, may be stored in memory 28. In some embodiments of the present invention, multiple instances of an application program which work on a common serialization resource. Thus, in this context, one or more processors referred to can be understood as software, a computer program (application program), that runs on an OLTP system. Depending on the examples, as will be explained herein, the one or more processors can also refer to the OLTP system.

Embodiments of the present invention provide an approach to global transaction serialization that that is portable across platforms. This approach can utilize objects of a distributed and/or shared computing environment (e.g., cloud-based objects) into which the system upon which global transaction serialization is performed is deployed. This approach can also utilize generic messaging. Embodiments of the present invention include a computer-implemented method, a computer program product, and a system which include program code executing on at least one processing resource which enables a framework to support transactional global serialization resource by utilizing non-transactional object stores and a messaging engine. In embodiments of the present invention, the program code achieves one or more or cluster level or global serialization by utilizing an object store of a shared distributed computing environment (e.g., a cloud-based object store) and publish-subscribe ("pub/sub") messaging model topology. In a pub/sub messaging model, any message published to a topic is immediately received by all of the subscribers to the topic. Pub/sub messaging can be used to enable event-driven architectures, or to decouple applications in order to increase performance, reliability and scalability. Some embodiments of the present invention also achieve global transaction serialization by maintaining transparency between different resource providers by handling all the transactional aspects for a given resource. Some embodiments of the present invention comprise at least three elements, facilitated via program code executing on one or more processors, which comprise a framework to support transactional global serialization resources using non-transactional object stores and a messaging engine. These elements can be embodied and/or executed on one or more computing resources and certain elements can share a given resource. The three elements are listed separately in order to illustrate various functionalities enabling transactional global serialization. The framework comprises: 1) a resource provider (e.g., a cloud-based data store) for storage and a messaging infrastructure for serialization; 2) a transaction enabler to handle all transactional aspects for a resource; and 3) a switch and/or interface to maintain the transparency between different resource providers.

In embodiments of the present invention, program code of an online transaction processor utilizes existing infrastructure in one or more resources of a distributed computing environment, such as a cloud computing environment, to globally serialize transactions. In some embodiments of the present invention, the program code utilizes an existing object store of a shared distributed computing environment (e.g., a cloud-based object store) to store transaction records as key-value pairs. As will be described in more detail herein, a transaction that is creating a serialization resource for a first time creates a key and populates metadata comprising the key. The key indicates that a lock is held by the transaction and the metadata that describes who is holding the lock. In some embodiments of the present invention, the program code utilizes an existing publish-subscribe ("pub/sub") messaging model topology. As described below, in addition to creating a key and populating metadata comprising the key, the transaction that is creating the serialization resource also generates a topic that can be subscribed to by other transactions that are waiting for the resource utilized (e.g., locked) by the transaction. Program code of the OLTP utilizes this pub/sub topic to communicate (e.g., flow) events on lock availability.

An advantage of various embodiments of the present invention is that in these embodiments, program code executing on one or more processors provides a transactional serialization resource on a distributed and shared computing environment, such as a cloud environment, without modifying the applications which are running on a standalone system. In some embodiments, the serialization functionality is embodied in program code comprising an application programming interface (API) which performs: 1) basic serialization capabilities; 2) automatic releases of serialization locks once a transaction performs a commit and/or rollback operation; and/or 3) recovery of a transactional serialization resource in the event of an abnormal termination of an application and/or of one or more application servers.

Embodiments of the present invention are inextricably linked to computing, the embodiments comprise a practical application, and the embodiments provide significant more than existing approaches to global serialization. First, embodiments of the present invention are inextricably linked to computing because they address an issue that is unique to computing, global transaction serialization across a distributed environment comprising a variety of resources. Second, embodiments of the present invention represent practical and efficient approaches to this global serialization, which is a challenge unique to these computing environments. Third, embodiments of the present invention involve significantly more than existing approaches to serialization because existing approaches are limited by being maintained by software in a resource-specific manner and therefore, these existing approaches are not scalable across shared computing environment. In contrast to these limited existing approaches, embodiments of the present invention are not resource-specific and are scalable across distributed computing environments, including but not limited to, cloud computing environments.

FIG. 1 illustrates an overview of a technical environment 100 into which aspects of some embodiments of the present invention can be implemented to provide serialization. FIG. 1 is a computing resource 105, referred to as a se which executes various applications accessible to a user, termed business applications 110 for ease of understanding. The computing resource 105 is a global serialization resource in embodiments of the present invention. The computing resource 105 also executes an operating system (OS) 120. On the computing resource 105, on top of the operating system 120, an online transaction processor (OLTP) 130 executes one or more applications processing interfaces (APIs) 140, which enable communications between the OLTP 130 and the business applications 110 executing on the computing resource 105. To communicate with the OLTP 130, a business application 110 calls an API 140. The OLTP 130 includes (or utilizes) a switch 150. In some embodiments of the present invention, the switch 150, which can be understood as an OLTP Global Resource Providing Switch, provides to the computing resource 105, through the OLTP 130, a set of interfaces that hide all the resource manager specific implementations. The switch 150 provides the OLTP 130 (and the computing resources 105, generally) with the flexibility of plugging in any combination of shared computing system (e.g., cloud-based) resources and/or resource managers. The resource managers provide the computing resource 105 with a storage (e.g., a key store) and pub/sub messaging capabilities. Through the resource managers, the program code provides a system-based (e.g., cloud-based) data store for storage and a messaging infrastructure for serialization. The components of the switch 150, in some embodiments of the present invention, are detailed in FIG. 2.

Returning to FIG. 1, the switch 150 maintains the transparency between different resource providers, which connect to the switch 150 via plugins 160a-160c. Thus, the switch 150 provides interfaces which are implemented for use of the OLTP 130. In some embodiments of the present invention, program code comprising a resource provider connector component implements the interfaces which enable the plugins 160a-160c. OLTP 130 acts as a transaction manager and a resource manager 170a-170c enables utilization of the business applications 110 of the resources managed by the resource managers 170a-170c. The resource managers 170a-170c thus provide a business application 110 executing on the resource 105 to access to a global resource 197 (e.g., a cloud resource). The resource manager 170a of the cloud resource 197 provides the computing resource 105 with a storage (e.g., a key store, a cloud-based object store) and pub/sub messaging capabilities such that the OLTP 130 can implement and track global serialization of resources utilized by transactions. In some embodiments of the present invention, the object store and the pub/sub framework can be provided by one or more individual resources of the distributed system. As will be discussed herein OLTP 130 will utilize a resource manager 170a-170c (e.g., a cloud resource manager) to store any key-value pair and use a pub/sub model (i.e., framework) for global transaction resource synchronization. The resource manager is accessible by the OLTP 130, from the instances connected to the plugins 160a-160c.

Figure 2:
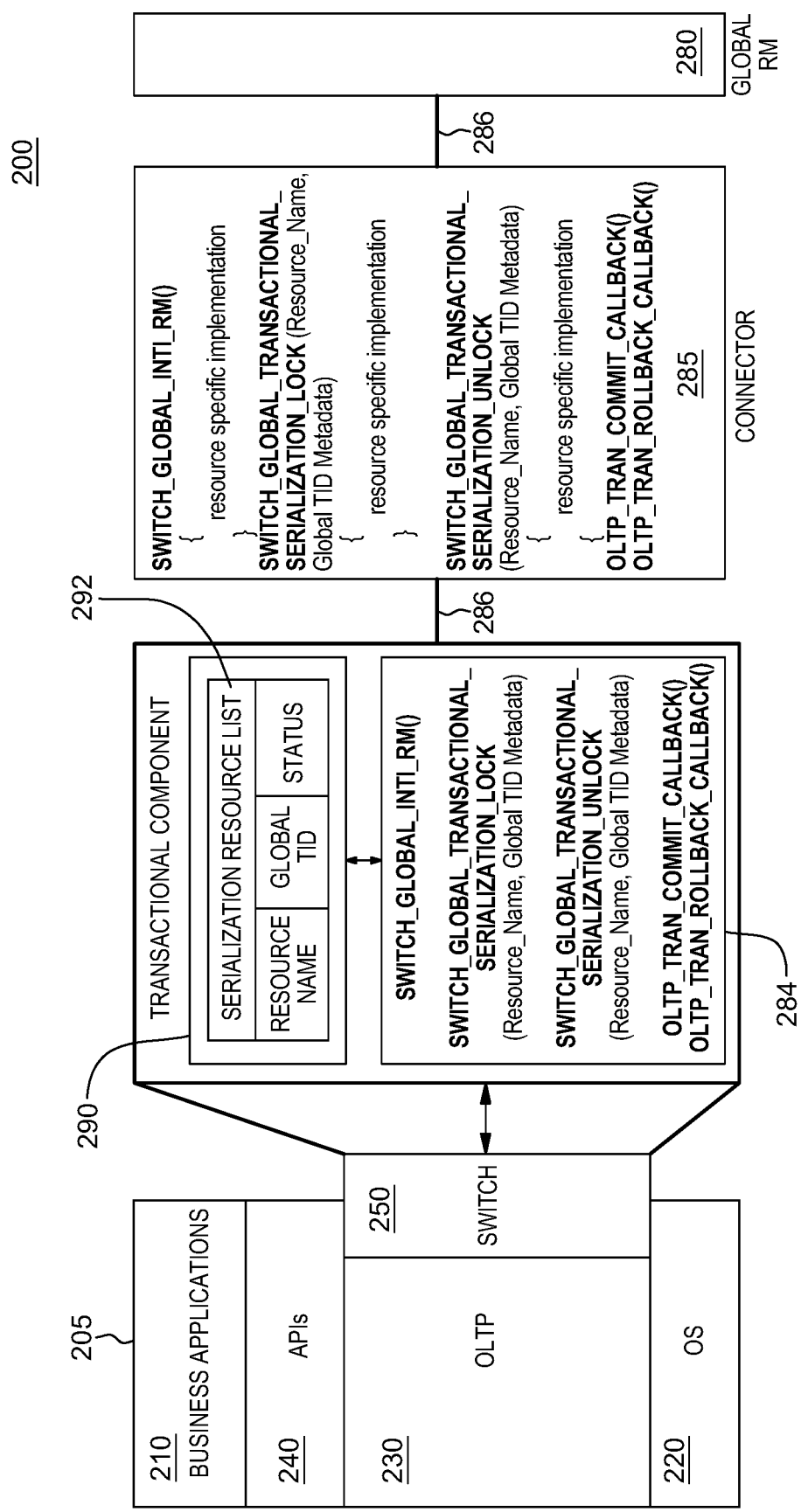
FIG. 2 illustrates various aspects of some embodiments of the present invention.

Turning to FIG. 2, FIG. 2 expands the illustration of the technical environment in FIG. 1 to show various aspects of the global serialization performed utilizing an OLTP 230 to manager transactions, highlighting, in particular, details of the interactions between the OLTP 230 and the resource manager 280 of the distributed computing environment (e.g., a cloud resource manager). In some embodiments of the present invention, program code comprising an OLTP 230 utilizes a resource manager 280 to store key-value pairs and uses a pub/sub model of the distributed network, accessed via the resource manager 280, to perform global transaction resource synchronization. The program code in embodiments of the present invention also comprises a switch 250 (i.e., OLTP Global Resource Providing Switch) that generates a set of interfaces that hides all the resource manager 280 specific implementation such that the OLTP 230 can connect, via a plugin 160a-160c (FIG. 1), to any combination of (e.g., cloud-based) resource managers that provide a key store and pub/sub capabilities.

Returning to FIG. 2, in some embodiments of the present invention, the switch 250 includes a transactional component 290. The transactional component comprises program code that manages all the transactional aspects of the global serialization resource 205. Program code comprising the transactional component 290 keeps track of all the resources that are associated with a transaction identifier (ID), as generated by the OLTP 230, acting as a transaction manager. In the embodiment illustrated, the program code of the transactional component 290 tracks resources utilizing a serialization resource list 292, which can comprise a data storage format, such as a text file and/or a database table or object. In some embodiments of the present invention, the transactional component 290 registers a set of functions 294, including but not limited to callbacks with the OLTP 230, working as a transaction manager, for transaction resolution. The functions 294 of the switch 250, including the callbacks, are discussed below. The serialization resource list 292 can include a resource name, global transaction identifier (generated by the OLTP 230), and a lock status. For example, the program code can enter an entry in a serialization resource list 292 in the format below:

Transaction ID|Resource Name|Lock Status

Thus, in a non-limiting example, an entry in the serialization resource list 292 is noted below:

98338334888|TRNLOCK123|YES

In addition to the serialized resource list 292, the switch 250 in some embodiments of the present invention also includes various functions 294 that the program code of the OLTP 230 can call in order to maintain global serialization. FIG. 2 illustrates the execution of the functions by the program code of the OLTP 230, via the switch 250, in a connection to the resource manager 280, via a resource manager connection 285, initiated and maintained by the switch 250. The functions can be understood as belonging to at least two categories: 1) callback functions; and 2) interface functions.

In some embodiments of the present invention, the callback functions (among the functions 294) can release and recover resources. FIG. 2 illustrates two callback functions, which can comprise the switch 250 in certain embodiments of the present invention: OLTP_TRAN_COMMIT CALLBACK( ) and OLTP_TRAN_ROLLBACK_ CALLBACK( )). When the program code executes the callback functions (initiating callbacks), the functions can facilitate actions including, but not limited to, an automatic release of serialization resource at the end of a logical unit of work (LUW) and recovery of resources when there is an abnormal termination of a transaction.

The switch 250 also includes in the functions 294, functions that comprise various interfaces implemented by program code comprising the resource provider connector component. Certain of various interfaces provided in some embodiments of the present invention are listed below. These interfaces can be utilized by program code comprising the OLTP 230.

As illustrated in FIG. 2, in some embodiments of the present invention, program code of the OLTP 230 calls an interface function during start-up to initialize global resource management, which is implemented by the switch 250.

Executing this function enables the switch 250 to connect the OLTP 230 and the resource manager 280. In the example of FIG. 2, SWITCH_GLOBAL_INIT_RM( ) is an interface function the program code of the OLTP 230 calls initially during start-up to initialize global resource management. The switch 250 implements the SWITCH_GLOBAL_INIT_RM( ) interface function by performing an initial connection to the resource manager 280 and to the OLTP 230 and maintaining the connection between these elements, illustrated in FIG. 2 as the resource manager connector 285. The switch 250 maintains the connection between the OLTP 230, the transaction manager, and the resource manager 280, via the resource manager connector 285. As illustrated in FIG. 2, the program code of the OLTP 230 calls the functions 284 (callback and interface) in the switch 250 and executes these functions of the resource manager 280 (i.e., communicates the functions to the resource manager 280), via the resource manager connector 285, maintained by the switch 250. As illustrated in FIG. 2, the parameters provided by the OLTP 230 in calling the functions 294, can be resource specific to the implementation of aspects of the present invention.

In embodiments of the present invention, the switch 250 also provides, among the interface functions in the functions 294, global resource locking and unlocking mechanisms. In the non-limiting example illustrated in FIG. 2, these functions are SWITCH_GLOBAL_TRANSACTIONAL_SERI-ALIZE_LOCK and SWITCH_GLOBAL_TRANSAC-TIONAL_SERIALIZE_UNLOCK, respectively. In embodiments of the present invention, each resource managed by the OLTP 230 (via the switch 250) is represented as a key and topic pair in the resource manager 280. The switch 250 enables the OLTP 230 to maintain a connection to the resource manager 280. The resource manager 280 tracks the resources of the distributed computing system. If a key is present in a pair representing a transaction, this presence indicates that a lock is held by the transaction. Meanwhile, the key itself comprises metadata that describes who (e.g., the transaction, the resource) that is holding the lock.

As noted above, embodiments of the present invention take advantage of hardware and software features of the resources of the distributed computing system into which they are implemented, including non-transactional object stores and the messaging engine. In embodiments of the present invention, a transaction that is created in a serialization resource for the first time creates the aforementioned key, populates the metadata, and also, creates/generates a topic that can be subscribed to by other transactions that are waiting for the resource locked by the transaction. While the transaction component 292 of the switch 250 can utilize non-transactional object stores of a resource to store transaction records in the form of key-value pairs in the resource manager 280, the program code utilizes a pub/sub topic to communicate (e.g., flow) events on lock availability because a transaction that is creating a serialization resource for the first time creates the key, populates the metadata, and create a topic that can be subscribed to by other transactions that are waiting for this resource. In embodiments of the present invention, when a resource is created in the distributed computing system, control is passed for the resource to the program code of the transaction component 292 of the switch 250 to keep the global transaction lock information. As discussed above, the program code of the switch 250 can maintain this information in the serialization resource list 292 (e.g., Transaction ID|Resource Name|Lock Status). While the transaction component 292 maintains the status, the OLTP 230, as the transaction manager, determines whether the lock (i.e., a global transaction lock) should be maintained or released. Meanwhile, the key-value pairs indicating whether a resource is locked are maintained by the program code of the OLTP 230 in the resource manager 280 (and/or a resource accessible via the resource manager 280).

As illustrated in FIG. 2, communications within the various aspects of the switch 250 can be understood as transaction manager connections or communications. The communications over the connector 285 to the resource manager 280 from the serialization resource 205, via the switch 250, and vice versa, are over the communication pathways of the distributed computing environment 286 (e.g., cloud communications).

Figure 3:
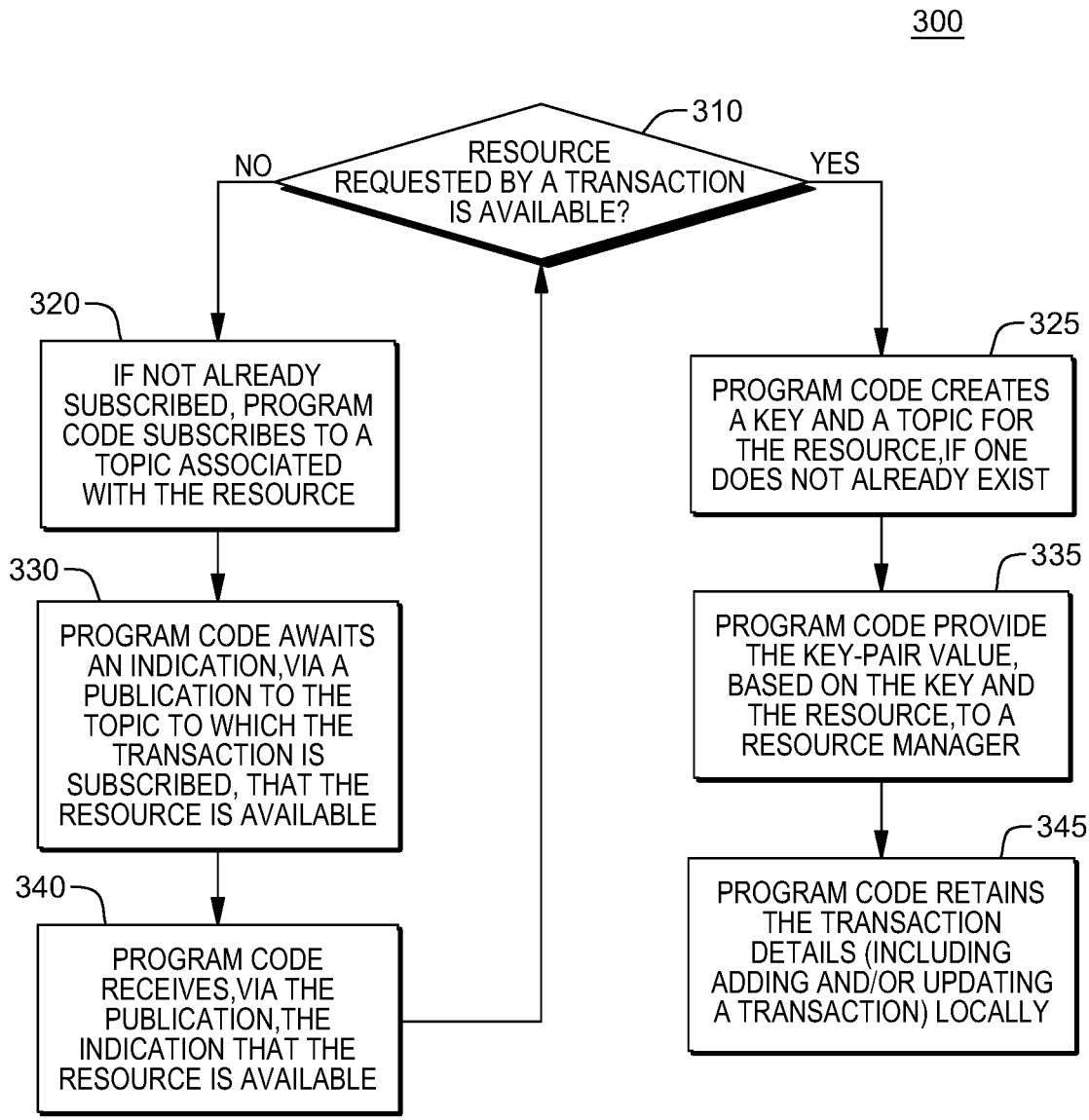
FIG. 3 is a workflow that illustrates certain aspects of some embodiments of the present invention.

FIG. 3 is a workflow 300 that illustrates global resource locking provided by the OLTP, in embodiments of the present invention. Throughout the explanation of this workflow 300, references are made to various aspects of the embodiments of the invention provided in FIG. 2. The utilization of this embodiment in only to illustrate various aspects of the present invention and not to impose any limitations.

In some embodiments of the present invention, program code executed by at least one processing resource determines whether a (e.g., global) resource requested by a transaction is available for use in executing the transaction, by connecting to a resource manager 280 of the distributed computing system (310). For example, to utilize a resource for a transaction, in an embodiment of the present invention, program code comprising the OLTP 230, via a switch 250 which maintains a connection between the serialization resource 205 and the resource manager 280 of the distributed computing environment (e.g., a cloud resource manager), determines whether the resource requested by the transaction is available by connecting to a resource manager 280 of the distributed computing system.

As illustrated in FIG. 3, program code of the OLTP 230 in a serialization resource 205, calls a function in the switch 250 to determine whether a given resource can be accessed by a transaction, or if that resource is locked by another transaction. In some embodiments of the present invention, the function call is made with the following parameters: 1) global_transaction_id, a transaction identifier generated by the OLTP 230 for the transaction; 2) serialized_resource_name, the name of the serialized resource requested by the transaction for executing the transaction; and 3) serialized_global_identity, unique identification information which is used to identify the resource lock holder.

In some embodiments of the present invention, this action by the program code is initiated responsive to the program code obtaining a request, via an API 240, from a business applications 210 running of the OS 220. The program code of the OLTP 230, in its role as a transaction manager, assigns a transaction identifier to the request. This transaction identifier can be understood as a global transaction identifier as it will be unique to the transaction within the distributed computing environment managed by the resource manager 280 of the distributed computing environment (e.g., a cloud resource manager). In some embodiments of the present invention, the program code of the OLTP 230 determines whether the resource requested by the transaction is available by calling a function (e.g., SWITCH_GLOBAL_TRANSACTIONAL_SERIALIZE_LOCK) in the switch 250, which queries a serialization resource list 292 maintained in the transactional component 290 of the switch 250. Parameters utilized by the program code to query the availability of a resource can include, but are not limited to resource name, global transaction identifier (as assigned by the OLTP 230), and metadata. In some embodiments of the present invention, the metadata describing the transaction and/or the owner of the transaction. The program code can execute the function as SWITCH_GLOBAL_TRANSACTIONAL_SERIALIZE_LOCK (resource_name, global transaction ID, metadata). The program code can utilize the aforementioned parameters of global_transaction_id, serialized_resource_name, and serialized_global_identity. The program code can execute the function on the resource manager 280, via the resource manager connector 285 (connecting the OLTP 230 with the resource manager 280 and maintained by the switch 250).

Returning to FIG. 3, based on determining that the resource requested by the transaction is not available, the program code subscribes to a topic associated with the resource (320). In some embodiments of the present invention, the program code determines that the resource is locked because it identifies a key-value pair for the resource in the resource manager 280. The program code determines whether a resource key exists for the given resource. The program code can subscribe to a topic (supported by the pub/sub messaging model topology of the resource manager 280 and/or one or more resources accessible via the resource manager 280) because the program code that created the a transaction that is created in a serialization resource for the first time creates the aforementioned key (in the key-par) as well as the topic. In a pub/sub topology and in embodiments of the present invention, other transactions that request the locked resource can subscribe to the topic in order to waiting for the resource utilized (e.g., locked) by the earlier transaction. In some embodiments of the present invention, the program code stores the resource status (determined by communicating with the resource manager 280 and ascertaining the key-pairs) in a transactional component 290 of the switch 230 (e.g., in a serialization resource list 292).

As illustrated in FIG. 3, based on subscribing to the topic, the program code awaits an indication, via a publication to the topic to which the transaction is subscribed, that the resource is available (330). The program code receives, via the publication, the indication that the resource is available (340). The indication can be a resource available event conveyed to the transaction, as a subscriber, in the pub/sub messaging system. Upon receiving the indication, the program code determines whether the resource requested by the transaction is available for use in executing the transaction, by connecting to a resource manager 280 of the distributed computing system (310). The program code repeats this determination because the transaction could be one of many subscribers awaiting the same resource. Thus, the program code determines even after receiving the indication, in some embodiments of the present invention, that the resource remains unavailable. If there resource is not available, the program code resumes awaiting the publication (330). The transaction remains subscribed to the topic.

In some embodiments of the present invention, if a transaction needs to access a resource for which a lock is held by another transaction, the transaction needing this access subscribes for that resource-specific topic and remains in a wait mode (330) by registering a callback function. When the resource holding transaction releases the resource, it will publish an event on the topic about the resource availability. In this example, the release of the resource results in the callback function being called. Based on the callback function, the transaction receives the availability event and the program code attempts to get the resource for the transaction. The transaction may either succeed or fail in getting this resource.

Based on determining that the resource requested by the transaction is available, the program code creates a key and a topic for the resource, if one does not already exist (325). A topic is created by the program code, for the transaction, when there was no previous attempt to utilize the given resource. If a topic already exists, it can be utilized by various transactions, via the program code in the OLTP 230, in order to receive indications that a resource has become available, via a messaging system. The program code provide the key-pair value, based on the key and the resource, to a resource manager 280 (e.g., a cloud or distributed system resource manager) (335). The program code retains the transaction details (including adding and/or updating a transaction) locally (345). In some embodiments of the present invention, the program code of the OLTP 230 stores the key-pair in the resource manager 280 and updates a transaction component 290 of the switch 250 (e.g., a serialization resource list 292) with the transaction status, including the resource name, transaction identifier, and resource status. In generating the key, the program code utilizes the metadata. The metadata is descriptive of the transaction owner utilizing the resource. As illustrated in FIG. 3, if an attempt to obtain a resource after an initial rejection succeeds, and a callback function was utilized, the (now-successful) transaction generates a key and/or updates the key with its metadata and the transactional component 290 updates the new transaction identifier and returns. This example, which is performed in some embodiments of the present invention is a synchronous blocking call, with an option to return immediately on failure to get a resource.

Figure 4:
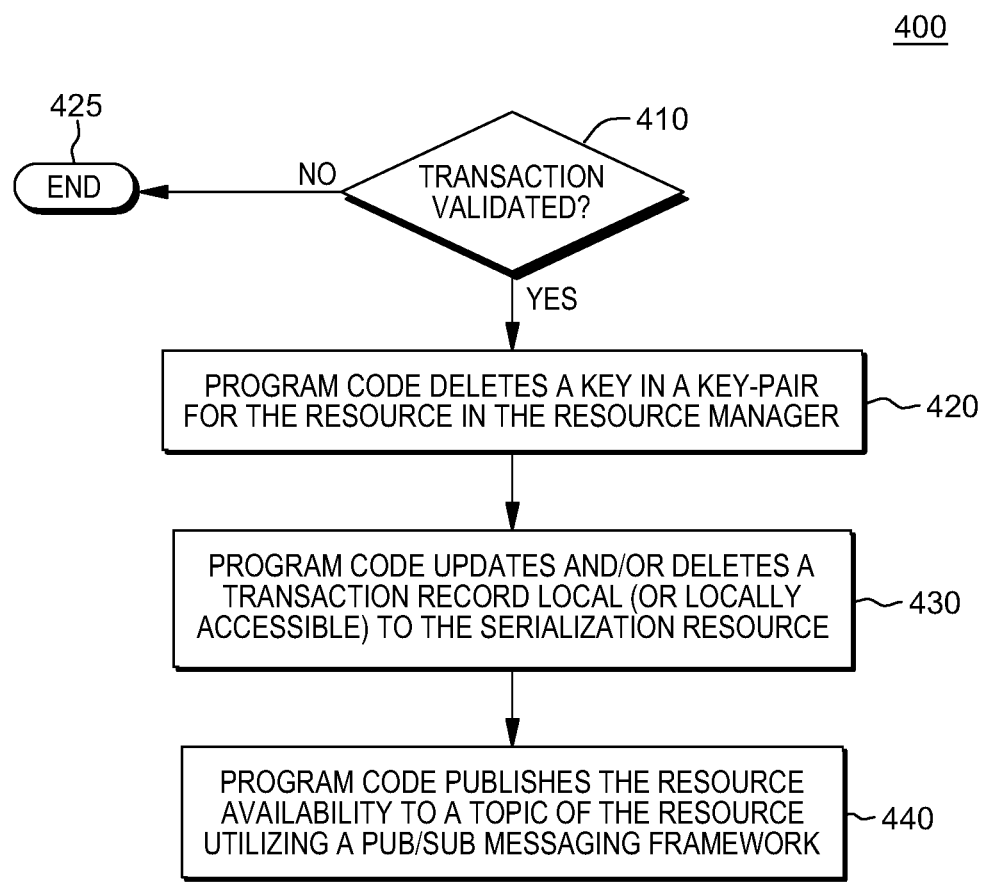
FIG. 4 is a workflow that illustrates certain aspects of some embodiments of the present invention.

FIG. 4 is a workflow 400 that illustrates the unlocking of a previously locked resource in an embodiment of the present invention and the indication of the availability of the resource to managed transactions awaiting the resource. As in FIG. 3, aspects of the embodiment of the present invention depicted in FIG. 2 are utilized throughout the explanation of this workflow 400, for illustrative purposes, only.

As aforementioned, the program code of the OLTP 230 of the serialization resource 205 controls, as a transaction manager, availability of serialized resources. The program code communicates with a (global) resource manager 280 to manage serialized resources, in part, by monitoring resource status with a local (or locally accessible to the serialization resource 205) transactional component 290. Thus, the program code may check to see whether a given serialized resource (i.e., managed in the transactional component) is available. This check can be useful when the resource was previously locked and managed transactions are awaiting the resource. The program code can perform this check via the connection (e.g., connector 285) maintained by the serialization resource 205 (specifically, in some embodiments of the present invention, a switch 250). Additionally, when an application 210 is no longer utilizing a lock that is acquired, by calling an API 240 to relay this request to the OLTP 230 (and subsequently be assigned a transaction number, such that the transaction would secure the lock), the application 210 can also release the lock by calling the API 240 and communicating with the OLTP 230 to release the lock.

Returning to FIG. 4, in some embodiments of the present invention, the program code of the serialization resource 205 validates a transaction, where the transaction has a lock on a given resource (410). If the transaction cannot be validated (e.g., an error is returned), the program code takes no further actions to unlock the resource utilized by the transaction (425). In some embodiments of the present invention, validating the transaction comprises determining if the transaction has completed or otherwise terminated. In embodiments of the present invention where the program code obtained a request from an application 210 to release the lock (conveyed via an API 240 called by the application 210), the program code of the OLTP 230 can determine the transaction associated with the application and validate that the transaction holds a lock (e.g., utilizing the serialization resource list 292) before releasing the lock. If the program code determines that the transaction is valid (e.g., holds a lock, has completed, and/or was otherwise terminated), the program code deletes a key in a key-pair for the resource in the resource manager 280 (420). The program code updates and/or deletes a transaction record local (or locally accessible) to the serialization resource 205 (430). In some embodiments of the present invention, the program code utilizes a transactional component 290 to tracks resources utilizing a serialization resource list 292. The program code can delete the record of the serialization resource list 292 relevant to the transaction. Upon deleting the key and the transaction record (which can be performed in any order or concurrently), the program code publishes the resource availability to a topic of the resource utilizing a pub/sub messaging framework (440). In some embodiments of the present invention, this publication is considered a resource availability event. As seen in FIG. 3, the transactions subscribed to the topic can they receive the published event and check the availability of the resource (e.g., FIG. 3, 330). As discussed above, the program code of the serialization resource 205 can unlock a resource in this manner by the program code of the OLTP 230 executing a function provided by the switch 250 on a connector 285 to a (global) resource manager 280. An example of a function utilized in embodiments of the present invention is SWITCH_GLOBAL_TRANSACTIONAL_SERIALIZE_UNLOCK, which can accept the same parameters as the SWITCH_GLOBAL_TRANSACTIONAL_SERIALIZE_LOCK function described above (e.g., resource_name, transaction identifier, and metadata and/or global_transaction_id, serialized_resource_name, and serialized_global_identity).

Figure 5:
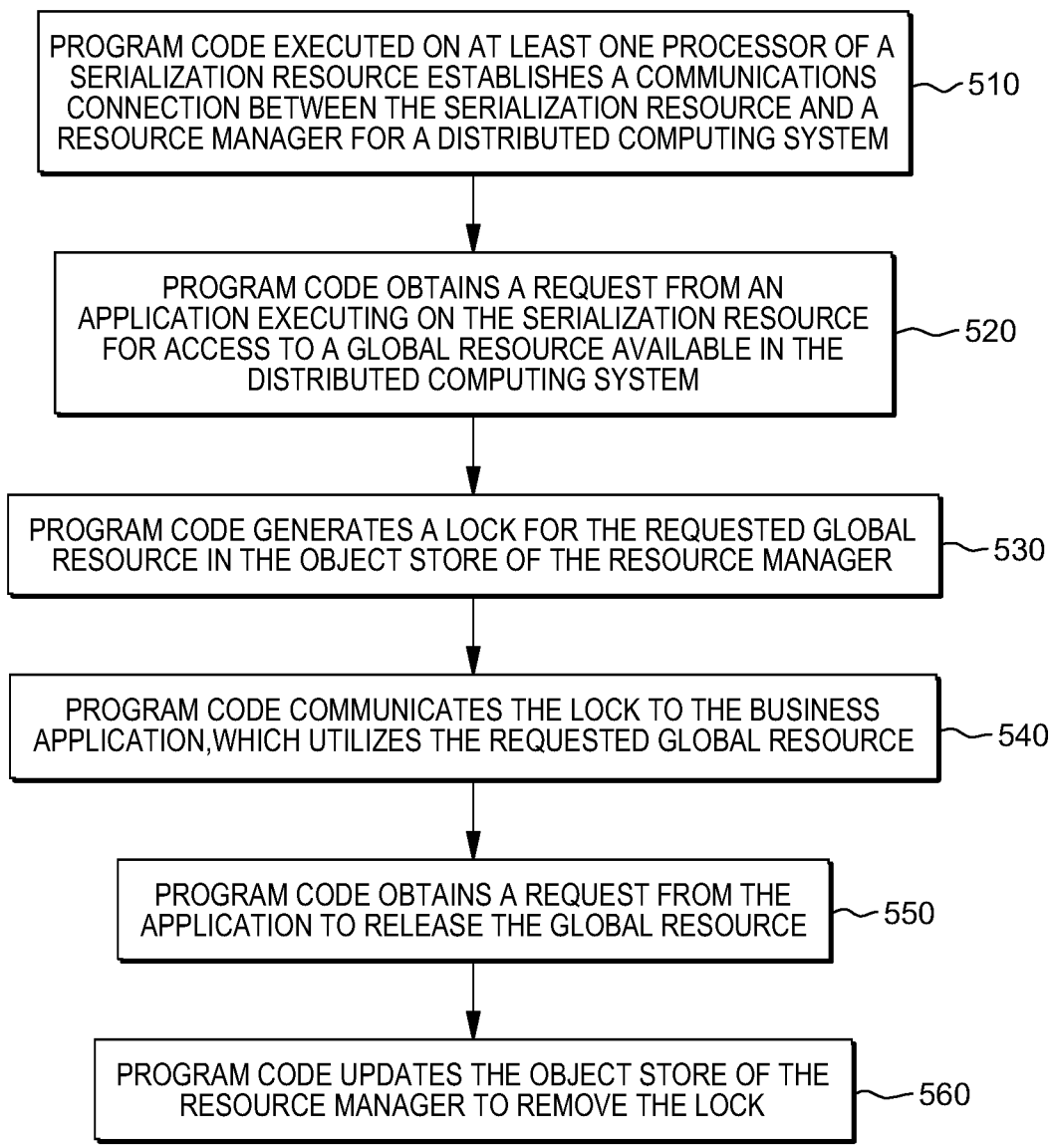
FIG. 5 is a workflow that illustrates certain aspects of some embodiments of the present invention.

FIG. 5 is a workflow 500 that provides an overview of various aspects of some embodiments of the present invention. This workflow 500, when contrasted with the workflows 300 400 of FIGS. 3-4, provides more of a big picture perspective on the illustrated aspects. The workflow 500 focusses on how an application (e.g., FIG. 1, 110, FIG. 2, 210) can obtain and release a lock on a global resource, in some embodiments of the present invention. As with FIGS. 3-4, references are provided throughout this workflow 500 discussion to aspects of FIG. 2 for illustrative purposes only and the references to FIG. 2 are not meant to introduce any limitations. In some embodiments of the present invention, program code executed on at least one processor of a serialization resource establishes a communications connection between the serialization resource and a resource manager for a distributed computing system (510). In some embodiments of the present invention, an OLTP 230 of the serialization resource 205 initializes the connection by executing a function (e.g., SWITCH_GLOBAL_INIT_RM) provided by a switch 250. In some embodiments of the present invention, the execution of this function generates the resource manager connector 285.

In some embodiments of the present invention, the program code obtains a request from an application executing on the serialization resource for access to a global resource available in the distributed computing system (520). As illustrated in FIG. 2, the program code of the OLTP 230 can obtain the request from a business application 110, which has called an API 140 (e.g., API_TRANSACTIONAL_RESOURCE_LOCK_NAME) to communicate with the OLTP 230. Based on obtaining the request, the program code generates a lock for the requested global resource in the object store of the resource manager (530). In some embodiments of the present invention, the program code of the OLTP 230 assigns a transaction number to the request and provides the request to the resource manager 280 based on calling a function of the switch 230 (e.g., SWITCH_GLOBAL_TRANSACTIONAL_SERIALIZE_LOCK) and connecting to the resource manager 280 via the resource manager connector 285. The workflow 300 of FIG. 3 illustrates aspects of a process by which a transaction initiated by the OLTP 230, based on the request from a business application 210 for a resource, in some embodiments of the present invention, obtains a lock.

Referring to FIG. 5, the program code communicates the lock to the application, which utilizes the requested global resource (540). As understood from FIG. 3, the program code can acquire the lock, if available, right away, or can subscribe to a topic of the resource and await an availability event before generating the lock.

The program code obtains a request from the application to release the global resource (550). In some embodiments of the present invention, the program code obtains the request via an API 240. The application called the API 240 (e.g., API_TRANSACTIONAL_RESOURCE_UNLOCK (RESOURRCE_NAME)) to communicate the lock release request to the program code of the OLTP 230. The program code updates the object store of the resource manager to remove the lock (560). The process of the unlocking of a global resource is provided in more detail in FIG. 4. However, in some embodiments of the present invention, the program code of the OLTP 230 obtains this request from the application 210, via the API 240 and then calls a function (e.g., SWITCH_GLOBAL_TRANSACTIONAL_SERIALIZE_UNLOCK) provided by the switch 250, via the connector 285, to release the lock in the resource manager 280. As illustrated in FIGS. 3-4, once the lock is removed, the transactions that subscribed to the topic associated with the lock receive an availability event from the messaging system. These transactions can then attempt to lock/utilize the global resource.

Embodiments of the present invention include a computer-implemented method, a computer system, and a computer program product where program code executing on one or more processors (of a serialization resource) establishes a communications connection between the serialization resource and a resource manager for a distributed computing system. The program code obtains a first request from an application executing on the serialization resource for access to a global resource managed by the resource manager, for executing a transaction. The program code implements a lock for the requested global resource in an object store of the resource manager, for the transaction, wherein the implementing is over the communications connection. The program code communicates the implementing of the lock to the application, wherein based on obtaining the communication, the application executes the transaction utilizing the requested global resource. Based on implementing the lock, the program code updates a memory accessible to the serialization resource with a record comprising attributes of the lock. The program code obtains a second request from the application to terminate the lock. Based on the second request, the program code obtains, from the memory, the attributes of the lock. The program code identifies, via the communications connection, based on the attributes, the lock for the transaction, in the object store of the resource manager. The program code updates, via the communications connection, the object store of the resource manager, to delete the lock on the requested global resource.

In some embodiments of the present invention, the attributes comprise: an identifier of the transaction, an identifier of the requested global resource, and a status of the lock.

In some embodiments of the present invention, implementing the lock for the requested global resource in the object store, for the transaction, further comprises: the program code determining, based on querying the object store of the resource manager, if the requested global resource is locked, based on determining that the requested global resource is not locked, the program code generating a key to pair with a resource value in the object store of the resource manager, and the program code implementing the key, paired with an identifier of the requested global resource, in the object store, where the key indicates the lock for the transaction. In some embodiments of the present invention, the key comprises metadata descriptive of an owner of the transaction. In some embodiments of the present invention, the owner is the application.

In some embodiments of the present invention, the program code also accesses a messaging system utilized by the resource manager. The program code determines if a unique topic was previously generated to indicate availability of the requested global resource. Based on determining that no unique topic was previously generated, the program code generates the unique topic. In some embodiments of the present invention, the messaging system comprises a publication and subscription messaging framework.

In some embodiments of the present invention, implementing the lock for the requested global resource in the object store, for the transaction, further comprises: the program code determining based on querying the object store of the resource manager, if the requested global resource is locked and based on determining that the requested global resource is locked, the program code subscribing, via a messaging system utilized by the resource manager, the transaction a unique topic to indicate availability of the requested global resource. In some embodiments of the present invention, the program code obtains, based on the updating to delete the lock on the requested global resource, via the messaging system, an availability event, indicating that the requested global resource is available.

In some embodiments of the present invention, the program code deletes the record.

In some embodiments of the present invention, based on the program code obtaining the first request, the program code assigns a transaction identifier to the transaction, wherein the transaction identifier comprises an attribute of the attributes.

In some embodiments of the present invention, the serialization resource comprises an online transaction processor and the first request and the second request are obtained by the online transaction processor via an application programming interface called by the application.

In some embodiments of the present invention the one or more processors utilize the online transaction processor to implement the lock for the requested global resource in the object store of the resource manager and to update the object store of the resource manager to delete the lock on the requested global resource, via the communications connection.

In some embodiments of the present invention, the communications connection is maintained by a switch between the online transaction processor and the resource manager.

Referring now to FIG. 6, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, the serialized guest (FIG. 1, 105, FIG. 2, 205), the resource manager (FIG. 2, 280), and the global resource (FIG. 1, 197) as executing on and/or comprising a cloud computing node 10 (FIG. 6) and if not a cloud computing node 10, then one or more general computing nodes that include aspects of the cloud computing node 10.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
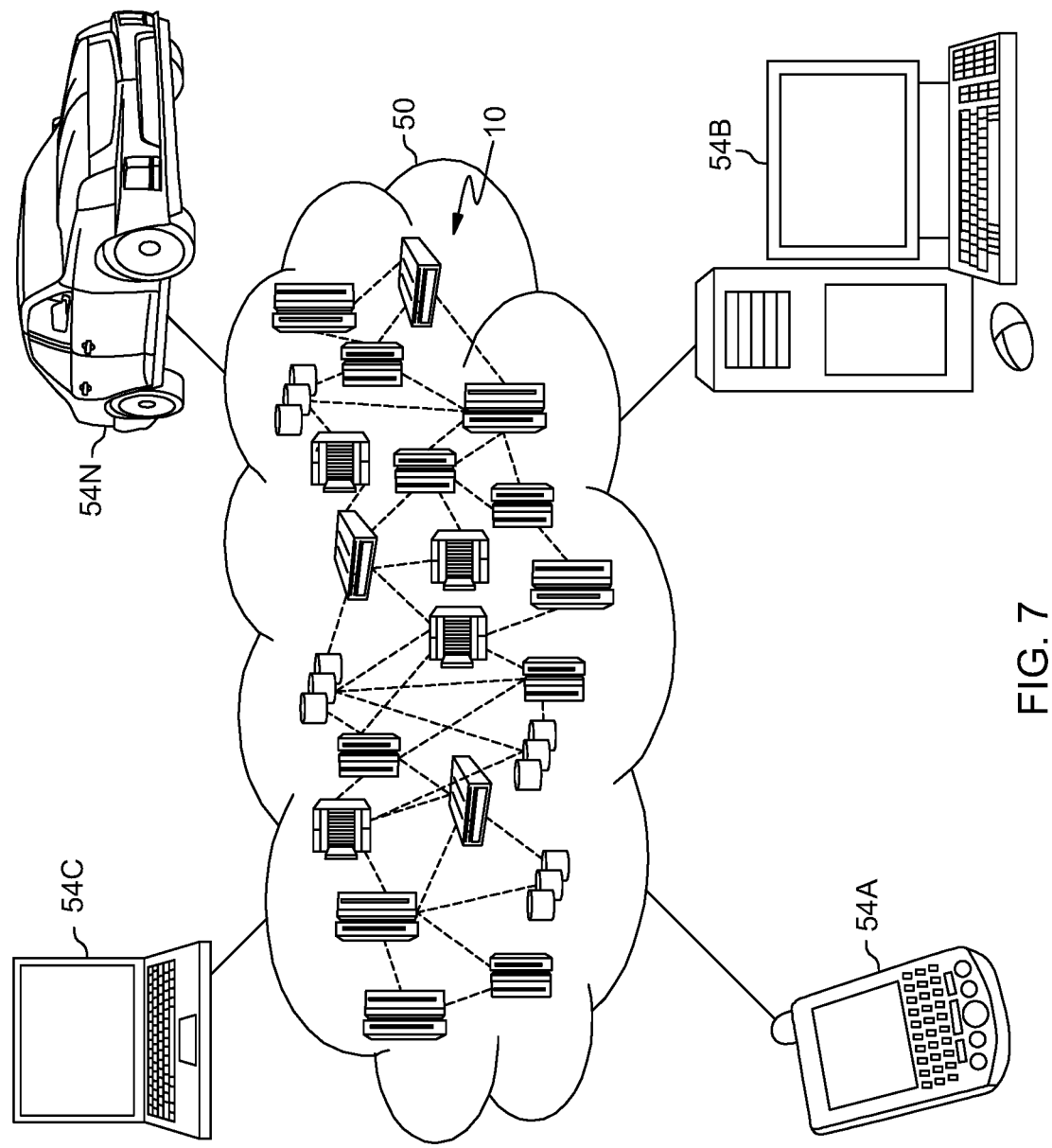
FIG. 7 depicts a cloud computing environment according to an embodiment of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
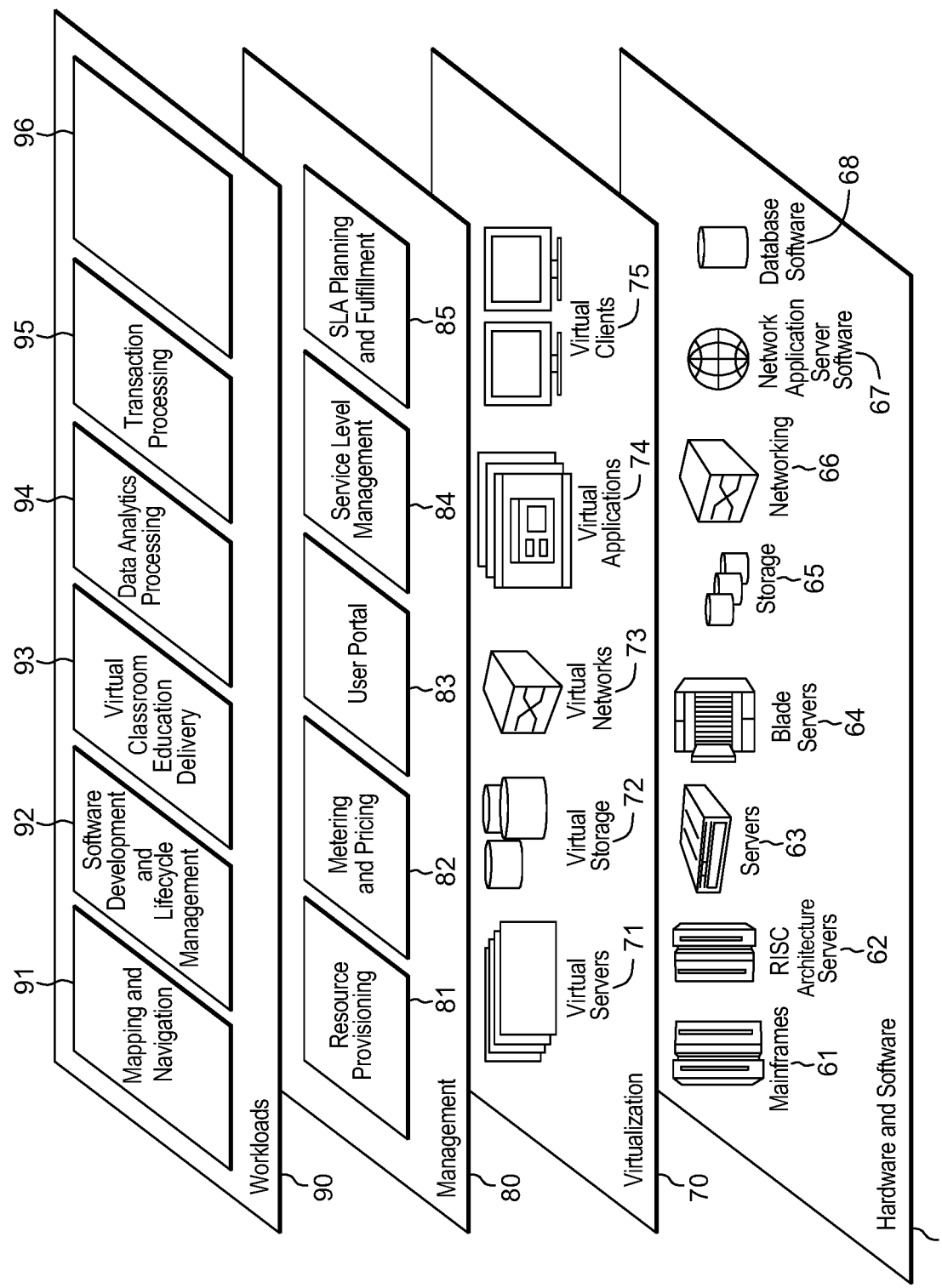
FIG. 8 depicts abstraction model layers according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and serializing global transactions over a distributed computing system 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    establishing, by one or more processors of a serialization resource, a communications connection between the serialization resource and a resource manager for a distributed computing system;
    obtaining, by the one or more processors, a first request from an application executing on the serialization resource for access to a global resource managed by the resource manager, wherein the global resource is a processing resource in the distributed computing system, for executing a transaction;
    implementing, by the one or more processors, a lock for the requested global resource in an object store of the resource manager, for the transaction, wherein the implementing is over the communications connection, wherein implementing the lock for the requested global resource in the object store, for the transaction, further comprises:
        generating, by the one or more processors, via a messaging system utilized by the resource manager, a unique topic to indicate availability of the requested global resource, wherein events on availability of the requested global resource are published to the unique topic, wherein the unique topic is subscribed to by additional transactions waiting to utilize the requested global resource, and wherein upon implementing the lock, an event is published to the unique topic indicating that the requested global resource is locked;
    communicating, by the one or more processors, the implementing of the lock to the application, wherein based on obtaining the communication, the application executes the transaction utilizing the requested global resource;
    based on implementing the lock, updating, by the one or more processors, a memory accessible to the serialization resource with a record comprising attributes of the lock;
    obtaining, by the one or more processors, a second request from the application to terminate the lock;
    based on the second request, obtaining, by the one or more processors, from the memory, the attributes of the lock;
    identifying, by the one or more processors, via the communications connection, based on the attributes, the lock for the transaction, in the object store of the resource manager; and
    updating, by the one or more processors, via the communications connection, the object store of the resource manager, to delete the lock on the requested global resource.

2. The computer-implemented method of claim 1, wherein the attributes comprise: an identifier of the transaction, an identifier of the requested global resource, and a status of the lock.

3. The computer-implemented method of claim 1, wherein implementing the lock for the requested global resource in the object store, for the transaction, further comprises:
    determining, by the one or more processors, based on querying the object store of the resource manager, if the requested global resource is locked;
    based on determining that the requested global resource is not locked, generating, by the one or more processors, a key to pair with a resource value in the object store of the resource manager; and
    implementing, by the one or more processors, the key, paired with an identifier of the requested global resource, in the object store, wherein the key indicates the lock for the transaction.

4. The computer-implemented method of claim 3, wherein the key comprises metadata descriptive of an owner of the transaction.

5. The computer-implemented method of claim 4, wherein the owner is the application.

6. The computer-implemented method of claim 1, wherein implementing the lock for the requested global resource in the object store, for the transaction, further comprises:
    determining, by the one or more processors, based on querying the object store of the resource manager, if the requested global resource is locked; and
    based on determining that the requested global resource is locked, subscribing, by the one or more processors, via the messaging system utilized by the resource manager, the transaction the unique topic to indicate availability of the requested global resource.

7. The computer-implemented method of claim 6, further comprising:
    obtaining, based on the updating to delete the lock on the requested global resource, via the messaging system, an availability event, indicating that the requested global resource is available.

8. The computer-implemented method of claim 1, further comprising:
    deleting, by the one or more processors, the record.

9. The computer-implemented method of claim 1, further comprising:
    based on obtaining, the first request, assigning, by the one or more processors, a transaction identifier to the transaction, wherein the transaction identifier comprises an attribute of the attributes.

10. The computer-implemented method of claim 1, wherein the serialization resource comprises an online transaction processor and wherein the first request and the second request are obtained by the online transaction processor via an application programming interface called by the application.

11. The computer-implemented method of claim 10, wherein the one or more processors utilize the online transaction processor to implement the lock for the requested global resource in the object store of the resource manager and to update the object store of the resource manager to delete the lock on the requested global resource, via the communications connection.

12. The computer-implemented method of claim 11, wherein the communications connection is maintained by a switch between the online transaction processor and the resource manager.

13. A computer program product comprising:
a computer readable storage medium readable by one or more processors and storing instructions for execution by the one or more processors for performing a method comprising:
establishing, by the one or more processors of a serialization resource, a communications connection between the serialization resource and a resource manager for a distributed computing system;
obtaining, by the one or more processors, a first request from an application executing on the serialization resource for access to a global resource managed by the resource manager, wherein the global resource is a processing resource in the distributed computing system, for executing a transaction;
implementing, by the one or more processors, a lock for the requested global resource in an object store of the resource manager, for the transaction, wherein the implementing is over the communications connection, wherein implementing the lock for the requested global resource in the object store, for the transaction, further comprises:
generating, by the one or more processors, via a messaging system utilized by the resource manager, a unique topic to indicate availability of the requested global resource, wherein events on availability of the requested global resource are published to the unique topic, wherein the unique topic is subscribed to by additional transactions waiting to utilize the requested global resource, and wherein upon implementing the lock, an event is published to the unique topic indicating that the requested global resource is locked;
communicating, by the one or more processors, the implementing of the lock to the application, wherein based on obtaining the communication, the application executes the transaction utilizing the requested global resource;
based on implementing the lock, updating, by the one or more processors, a memory accessible to the serialization resource with a record comprising attributes of the lock;
obtaining, by the one or more processors, a second request from the application to terminate the lock;
based on the second request, obtaining, by the one or more processors, from the memory, the attributes of the lock;
identifying, by the one or more processors, via the communications connection, based on the attributes, the lock for the transaction, in the object store of the resource manager; and
updating, by the one or more processors, via the communications connection, the object store of the resource manager, to delete the lock on the requested global resource.

14. The computer program product of claim 13, wherein the attributes comprise: an identifier of the transaction, an identifier of the requested global resource, and a status of the lock.

15. The computer program product of claim 13, wherein implementing the lock for the requested global resource in the object store, for the transaction, further comprises:
determining, by the one or more processors, based on querying the object store of the resource manager, if the requested global resource is locked;
based on determining that the requested global resource is not locked, generating, by the one or more processors, a key to pair with a resource value in the object store of the resource manager; and
implementing, by the one or more processors, the key, paired with an identifier of the requested global resource, in the object store, wherein the key indicates the lock for the transaction.

16. The computer program product of claim 15, wherein the key comprises metadata descriptive of an owner of the transaction and wherein the owner is the application.

17. A computer system comprising:
a memory;
one or more processors in communication with the memory;
program instructions executable by the one or more processors via the memory to perform a method, the method comprising:
establishing, by the one or more processors of a serialization resource, a communications connection between the serialization resource and a resource manager for a distributed computing system;
obtaining, by the one or more processors, a first request from an application executing on the serialization resource for access to a global resource managed by the resource manager, wherein the global resource is a processing resource in the distributed computing system, for executing a transaction;
implementing, by the one or more processors, a lock for the requested global resource in an object store of the resource manager, for the transaction, wherein the implementing is over the communications connection, wherein implementing the lock for the requested global resource in the object store, for the transaction, further comprises:
generating, by the one or more processors, via a messaging system utilized by the resource manager, a unique topic to indicate availability of the requested global resource, wherein events on availability of the requested global resource are published to the unique topic, wherein the unique topic is subscribed to by additional transactions waiting to utilize the requested global resource, and wherein upon implementing the lock, an event is published to the unique topic indicating that the requested global resource is locked;
communicating, by the one or more processors, the implementing of the lock to the application, wherein based on obtaining the communication, the application executes the transaction utilizing the requested global resource;
based on implementing the lock, updating, by the one or more processors, a memory accessible to the serialization resource with a record comprising attributes of the lock;
obtaining, by the one or more processors, a second request from the application to terminate the lock;

based on the second request, obtaining, by the one or more processors, from the memory, the attributes of the lock;

identifying, by the one or more processors, via the communications connection, based on the attributes, the lock for the transaction, in the object store of the resource manager; and updating, by the one or more processors, via the communications connection, the object store of the resource manager, to delete the lock on the requested global resource.

\* \* \* \* \*